Figure 1:
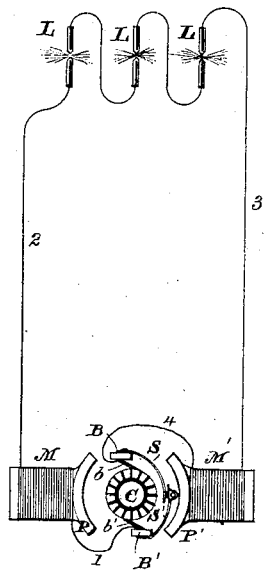

(No Model.)

H. R. BOISSIER.
DYNAMO ELECTRIC MACHINE.

No. 310,782.        Patented Jan. 13, 1885.

WITNESSES
Wm A. Skinkle
Geo. W. Breck.

INVENTOR
Hermann R. Boissier
By his Attorney

UNITED STATES PATENT OFFICE.

HERMANN R. BOISSIER, OF NEW YORK, N. Y.

DYNAMO-ELECTRIC MACHINE.

SPECIFICATION forming part of Letters Patent No. 310,782, dated January 13, 1885.

Application filed March 5, 1883. (No model.) Patented in England January 22, 1883, No. 357; in France January 22, 1883, No. 153,253; in Belgium January 22, 1883, No. 60,233; in Germany January 24, 1883, No. 25,602, and in Austria August 7, 1883, No. 4,289.

*To all whom it may concern:*

Be it known that I, HERMANN R. BOISSIER, of New York, in the county of New York and State of New York, have invented a new and useful Improvement in Dynamo-Electric Machines; and I do hereby declare that the following is a full and exact description of the same, reference being had to the accompanying drawings, and to the letters of reference marked thereon.

It is well known that whenever an electric circuit is broken that a high-tension reflex current is generated at the moment of breaking, termed, ordinarily, the "extra current," which gives rise to sparks at the point of breakage, and oftentimes also at any comparatively weak insulated points, where, as in the case of dynamo-machines, two or more portions of the circuit may be in contiguity. Such sparks are, in the one instance, destructive of the contact-points at the place of breakage, and, in the second instance, of the insulation, creating "crosses," leading primarily to weakening and eventually to destruction of the organization in which it occurs. These evils are especially liable to occur in dynamo-electric machines supplying current to several electric lamps or other translating devices of comparatively high resistance.

The object of my invention is to prevent to a great extent such injurious currents, and to prevent any spark from the extra current, if such there still may be, obviating the dangers to contact-points and armatures before noted. This I accomplish by controlling the main circuit, without even breaking it, by means of an improved switch, forming a shunt thereto between the poles of the generator, which, closed, shall simply afford a path of a resistance much less than that of the main circuit, so that while the latter remains constantly closed the shunt takes therefrom practically all the current.

In the drawings are shown a simple construction by which the invention may be carried into effect, and in which—

Figure 2:
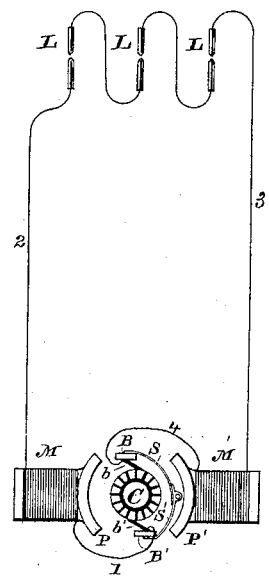
Figure 3:
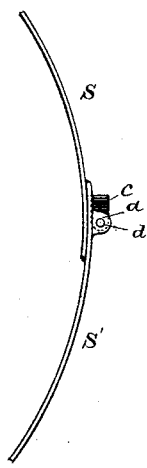
Figure 4:
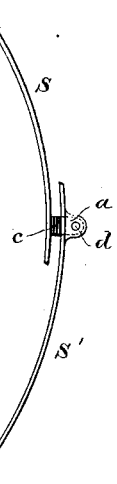
Figure 5:
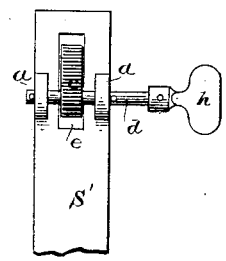

Figures 1 and 2 are diagrammatic views showing the shunt and switch applied to a generator and circuit; and Figs. 3, 4, and 5, enlarged views of a switch which may be used therewith.

In these figures, M M' are the field-of-force magnets of any dynamo or magneto electric machine having poles or polar extensions P P', within which rotates the inductive coil or coils or armature, whose commutator or collector C is here shown, upon which take brushes, springs, or collectors $b$ $b'$, supported in the frames B B'. From the brush and frame B' $b'$ a wire, 1, leads to M, while from B $b$ the wire 4 leads to M'. From M the wire 2 leads away and to any distance and through any kind or number of translating devices, (here represented by lamps L L,) from which wire 3 leads to M', a complete circuit being formed from C via B' $b$ 1 M 2 L L L 3 M' 4 B $b$ back to C, and containing no switch or other device for interrupting the circuit, unless some circuit-breaking or circuit-transferring devices be located at the translating devices for the purposes of such devices. B B' are, however, connected by a short circuit, which forms a shunt to the main circuit just described, and which does contain a circuit-controlling device. This short circuit is here shown by the parts S S', each part being a piece of rather stiff spring metal of good electrical conductivity, one piece, as S', being in electrical contact with the frame and collectors B $b$, while the other is in electrical contact with the frame and collectors B' $b'$. They are arranged to normally overlap each at their free ends, and springing against each other by their own resilience, to form good electrical contact, as shown in Figs. 2 and 3. In one of these, S, in these drawings, is cut a slot, $e$, and upon its outer sides are formed two bracelets or lugs, $a$ $a$, forming bearings for a rod, $d$, having a head, $h$, (shown in Fig. 5, but removed from Figs. 3 and 4, in order not to obscure the operations of the parts.) Upon this rod $d$, and within the slot $e$, is eccentrically mounted an eccentric, cam, or block, $c$, of insulating material. The cam or block $c$ being eccentrically mounted, is, when $d$ is turned in one position, entirely above the inner end of S, so that S and S' impinge as in Figs. 2 and 3. When $d$ is turned a quarter way around, $e$ projects upon the inner side and forces S and S' apart, as shown in Figs. 1 and 4. From this explanation the operation is evident. When desired to use the main circuit, the parts are in the position shown in Figs. 1 and 4, when the connection between S and S' being broken there is but one path for the current—viz., B' $b'$ 1 M 2 L 3 M' B $b$. If, now, it be desired to practically or in effect break the main circuit, $d$ is turned until $e$ is clear of S', allowing S and S' to contact, when the second circuit S S' is closed. This being of exceedingly small resistance, comparatively, takes practically all the current from the main circuit. If, now, from this there should be any extra current in the main circuit, it circulates therein and the electrical equilibrium is restored without spark. At the same time, as the generator here shown is a dynamo with the field-coils of M M' in the main circuit, they are also short-circuited, and generation immediately diminishes and finally ceases.

It is evident that in the switch or circuit controller here shown as consisting of S S', and associated devices, that many modifications may be made—for instance, that S S', instead of being of springy material, and hence self-resilient, may have applied to them external springs; that the cam or eccentric may be applied to either part; that instead of working through a slot in one, it may work upon the side of one, or be hollowed to embrace and work upon both sides.

I am aware that a continuity-preserving switch or key has been used with a dynamo-electric machine, adapted and arranged to close a circuit around the armature of the machine just before breaking the main circuit, which latter circuit is then to be completely broken. Such an arrangement and combination requires a larger number and greater complication of circuit-connections and contact-points than the method herein described, wherefore I do not use and do not claim such; but What I do claim is—

The combination, with the poles or brushes or collectors of a dynamo-electric machine, of a switch formed of the resilient conductors S S', one of which is provided with means for forcing their contiguous ends apart, substantially as set forth.

This specification signed and witnessed this 16th day of October, 1882.

HERMANN R. BOISSIER.

Witnesses:
A. ARNOUX,
V. RITSCHY.